Jan. 13, 1953     T. R. SMITH     2,625,415

FLEXIBLE SPLINED CONNECTION

Filed April 29, 1950

Inventor
Thomas R. Smith

By Wilkinson, Huxley, Byron & Hume
Attorney

Patented Jan. 13, 1953

2,625,415

UNITED STATES PATENT OFFICE 2,625,415

FLEXIBLE SPLINED CONNECTION

Thomas R. Smith, Newton, Iowa, assignor to The Maytag Company, Newton, Iowa, a corporation of Delaware Application April 29, 1950, Serial No. 158,993

5 Claims. (Cl. 287—53)

1

The invention relates to a splined connection and more particularly to a flexible splined connection for a pair of rotatable members.

When manufacturing splined connections for coupling two members together it is quite often difficult to machine the splines in the shaft and mating passage so that when operating looseness between the connection will not develop. If the mating splines in the connection are loose and the members are oscillated rapidly, relative movement between the two occurs and causes an objectionable noise or knock. In addition, when the direction of movement of one of the members is reversed this results in undue wear at the connection. Also, unless special means are provided, should the spline connection be loose the members may shift axially with respect to one another and there is danger that the two members will become disengaged.

In the proposed construction, one of the members is provided with a splined passage and the other of the members has one end formed so as to provide a plurality of mating splines or keys which are individually flexible and resilient to insure proper contact with the splined passage, and lugs are provided on the outer surface of the keys which are adapted to enter an annular channel provided in the first member to limit relative axial movement between the two.

It is therefore an object of the invention to provide a flexible splined connection which insures proper contact between the splines by making the mating keys on one of the members individually flexible and resilient and to lock the two members to prevent relative axial movement therebetween.

It is another object of the invention to provide a flexible splined connection for a pair of members in which one of the members is provided with a plurality of integral independently flexible longitudinally extending keys which are expanded in such manner as to insure contact over the entire contact area of a mating splined passage.

It is still another object of the invention to provide a flexible splined connection for a pair of members which insures proper contact between the splines and to provide a plurality of outwardly projecting lugs on the flexible splines adapted to fit within an annular channel in the mating member to prevent relative axial shifting movement.

Other objects, features, capabilities and advantages are comprehended by the invention as will later appear and as are inherently possessed thereby.

2

Referring to the drawings.

Figure 1:
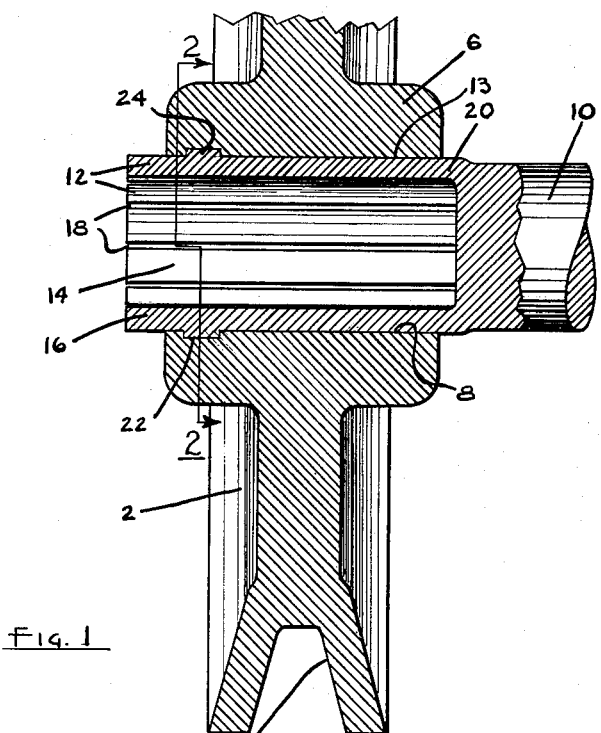
Figure 1 is a vertical longitudinal sectional view of the improved spring splined connection as applied to a shaft and pulley.
Figure 2:
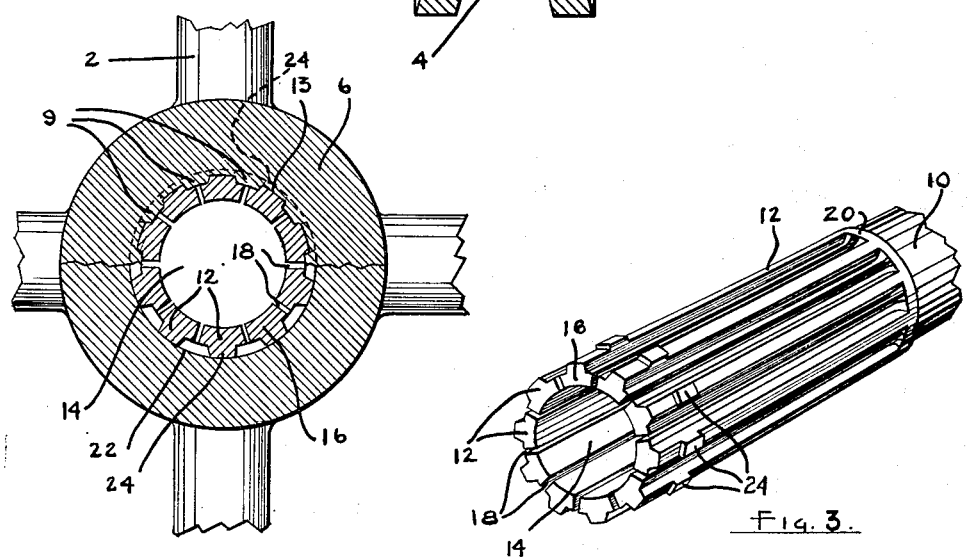
Figure 2 is a transverse vertical sectional view taken in the planes represented by line 2—2 of Figure 1; and, Figure 3 is a perspective view of the shaft showing the individually flexible keys and locking lugs in detail.
Figure 3:
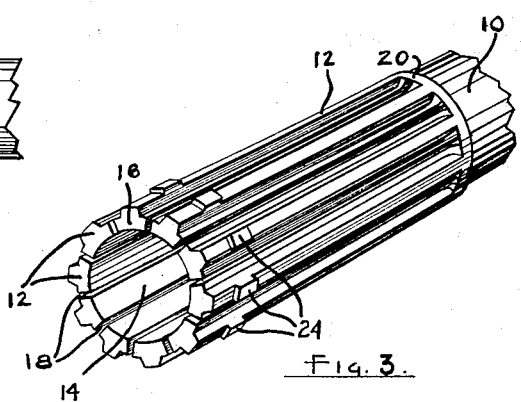

Referring now more in detail to the drawings, an embodiment elected to illustrate the present invention is disclosed in Figures 1, 2 and 3 of the drawings and it comprises a first member or pulley 2 having an outer V-groove 4 for receiving a belt (not shown) and an inner enlarged hub portion 6 which has a passage 8 extending therethrough with a plurality of spaced longitudinal splines or keys 9 formed therein to provide a plurality of spaced keyways 13 therebetween. A second member or shaft 10 has one end thereof formed with a plurality of splines or keys 12 adapted to closely fit in the keyways 13 between the keys 9 in the passage 8. In this instance the splined end of the shaft 10 has an axial or longitudinally extending co-axial recess or hollowed out portion 14 preferably of a greater length than the width of the hub 6 formed therein to provide a ring 16 and the ring has a plurality of longitudinally extending slots 18 cut intermediate the splines 12 for the length of the recess. In this manner a plurality of spaced substantially parallel, flexible and resilient keys 12 are provided at the end of the shaft 10 as an integral part thereof.

After the slotting or cutting operation the splined end of the shaft may be placed in a mandrel or similar apparatus and the longitudinally extending keys are permanently expanded radially by applying pressure to the ring 16 at the base portion 20 of the recess so that the outer diameter of the circumferentially spaced keys 12 is slightly larger than the diameter of the splined passage 8. Upon assembly, the keys 12 are individually flexed inwardly a slight amount and when in position each individual key 12 contacts a portion of the adjacent keys 9 and its mating keyway 13 in the hub 6 to thereby maintain even contact and constant pressure along the entire length and diameter of the passage. It is to be understood that the particular manner or means for expanding the individual keys 12 is immaterial to this invention.

From the foregoing it can be seen that a flexible splined connection has been provided which insures proper contact with the mating splines 9 in the passage 8 and noise due to looseness in the splines has been eliminated and that due to the flexibility and resiliency of the individual splines and the flexibility of the assembly a slight relative tilting movement may take place without undue damage or wear to the assembly.

In order to prevent relative axial shifting movement between the two members the hub 6 is provided with an annular recess or channel 22 opening inwardly in the passage 8 which is of greater depth than the outermost dimension of the keyways 13 between the keys 9. Prior to forming the splines on the shaft 10 an outer annular ridge is machined on the shaft of such dimensions as to fit within the recess 22. After the splines have been machined and slotted this ridge provides a group of individual outwardly extending lugs or tabs 24 which are adapted to fit within the recess 22 and when assembled insure the locking of the shaft 10 and pulley 2 against relative axial shifting movement.

In order to disconnect or disassemble the two members the keys 12 are formed so that they extend outwardly beyond the outer end of the hub 6 and any suitably shaped tool may be utilized to engage the projecting ends of the keys to move or compress them radially inwardly until the lugs 24 clear the recess 22 in the hub, after which one of the members may be moved axially in the proper direction to disconnect the two members. Upon assembly the splined end of the shaft is inserted in the passage and the splines or keys 12 are moved radially inward so the lugs 24 can ride in the keyways 13. When the lugs move in position adjacent the recess 22 the resiliency in the individual splines causes them to move radially outward and the lugs enter the recess 20 to lock the members 2 and 10 in position. It is to be understood, of course, that lugs need not be provided on each spline or key to insure locking of the members.

From the foregoing it can be seen that a flexible splined connection for a pair of members has been provided which eliminates noise due to looseness, is flexible and which is locked against relative axial shifting movement.

While I have herein described and upon the drawings shown an illustrative embodiment of the invention, it is to be understood that the invention is not limited thereto but may comprehend other constructions, arrangements of parts, details and features without departing from the spirit of the invention.

It is claimed:

1. A splined connection for a pair of members, comprising a first member provided with a passage therethrough having a plurality of spaced keyways and having an annular recess therein, a second member having a plurality of spaced substantially parallel, flexible and resilient keys formed integral therewith and fitting within said keyways to provide a driving connection, and a lug formed on at least one of said keys for engaging said annular recess to lock said members against relative axial movement, the open end of said second member formed by said keys extending outwardly beyond said first member to provide means adapted to be engaged by a tool adapted to flex said keys radially inwardly for moving said lug from said recess for uncoupling said members.

2. A flexible splined connection comprising a pulley having a hub portion with a passage therethrough having a plurality of spaced keyways and having a recess opening into said passage, a shaft having one end thereof provided with a longitudinal recess and a plurality of spaced longitudinal slots to provide a plurality of substantially parallel, flexible and resilient keys for engaging said keyways, and lugs formed on the outer portion of said keys for engaging the recess in said pulley to prevent relative axial movement of said shaft and pulley.

3. In combination, a first member provided with a passage having a plurality of spaced keyways and having an annular recess opening in the direction of said passage, a second member having spaced integral substantially parallel, flexible and resilient keys fitting within said keyways, and a lug formed on at least one of said keys for engaging said recess to limit relative axial movement between said members.

4. In combination, a first member provided with a passage having a plurality of spaced keyways and having an annular recess opening into said passage, a second member having a plurality of spaced integral substantially parallel, flexible and resilient keys extending from said member and fitting within said keyways; said keys having an over-all diameter slightly greater than the diameter of said passage to insure contact with said keyways; and lugs on said keys for fitting in said recess to limit relative axial movement of said members.

5. In a flexible splined connection, the combination of a first member provided with a passage therethrough having a plurality of spaced keyways and having an annular inwardly opening recess therein, a second member having a plurality of spaced substantially parallel, flexible and resilient keys formed integral with said second member and fitting within said keyways to engage the same, and a plurality of outwardly extending lugs carried by said keys for engaging said recess to limit relative axial movement of said members, the open end of said second member formed by said keys extending outwardly beyond said first member to provide means adapted to be engaged by a tool adapted to flex said keys radially inwardly for moving said lugs from said recess for uncoupling said members.

THOMAS R. SMITH.

REFERENCES CITED

The following references are of record in the file of this patent:

UNITED STATES PATENTS

| Number | Name | Date |
|--------|------|------|
| 813,178 | Smith et al. | Feb. 20, 1906 |
| 2,466,097 | Graue | Apr. 5, 1949 |

FOREIGN PATENTS

| Number | Country | Date |
|--------|---------|------|
| 322,943 | Germany | July 12, 1920 |